US 11,735,705 B2

United States Patent
Harutyunyan et al.

(10) Patent No.: US 11,735,705 B2
(45) Date of Patent: *Aug. 22, 2023

(54) PRODUCTION OF CARBON NANOTUBE MODIFIED BATTERY ELECTRODE POWDERS VIA SINGLE STEP DISPERSION

(71) Applicants: HONDA MOTOR CO., LTD., Tokyo (JP); NANOSYNTHESIS PLUS, LTD., Columbus, OH (US)

(72) Inventors: Avetik Harutyunyan, Santa Clara, CA (US); Neal Pierce, Beavercreek, OH (US); Elena Mora Pigos, Galena, OH (US)

(73) Assignees: HONDA MOTOR CO., LTD., Tokyo (JP); NANOSYNTHESIS PLUS, LTD., Columbus, OH (US)

( * ) Notice: Subject to any disclaimer, the term of this patent is extended or adjusted under 35 U.S.C. 154(b) by 247 days.

This patent is subject to a terminal disclaimer.

(21) Appl. No.: 17/121,206

(22) Filed: Dec. 14, 2020

(65) Prior Publication Data

US 2021/0104721 A1 Apr. 8, 2021

Related U.S. Application Data

(63) Continuation of application No. 15/604,131, filed on May 24, 2017, now Pat. No. 11,081,684.

(51) Int. Cl.
*H01M 4/04* (2006.01)
*C01B 32/159* (2017.01)
(Continued)

(52) U.S. Cl.
CPC ......... *H01M 4/0419* (2013.01); *C01B 32/159* (2017.08); *C01B 32/174* (2017.08);
(Continued)

(58) Field of Classification Search
CPC .... B82Y 40/00; C01B 2202/02; H01M 4/625; H01M 4/0419; H01M 4/362; H01M 4/663
(Continued)

(56) References Cited

U.S. PATENT DOCUMENTS 3,513,034 A  5/1970  Fischbach et al.
3,772,084 A  11/1973  Scholle
(Continued)

FOREIGN PATENT DOCUMENTS

CN  1922347 A  2/2007
CN  1972739 A  5/2007
(Continued)

OTHER PUBLICATIONS

Communication dated May 6, 2022, from the State Intellectual Property Office of People's Republic of China in Chinese Application No. 201710150360.3.
(Continued)

*Primary Examiner* — Tri V Nguyen
(74) *Attorney, Agent, or Firm* — ArentFox Schiff LLP; Mark Duell (57) ABSTRACT

Methods of making single walled carbon nanotubes (SWNTs) including a single step for preparing a homogeneous dispersion of SWNTs in a battery electrode powder. The method may comprise providing a reactor in fluid communication with a mixer, wherein an aerosol containing SWNTs is transmitted from the reactor directly to the mixer containing a battery electrode powder.

17 Claims, 2 Drawing Sheets

(51) Int. Cl.
  *H01M 4/139* (2010.01)
  *C01B 32/174* (2017.01)
  *H01M 4/13* (2010.01)
  *H01M 4/62* (2006.01)

(52) U.S. Cl.
  CPC .............. *H01M 4/13* (2013.01); *H01M 4/139* (2013.01); *H01M 4/625* (2013.01); *H01M 4/623* (2013.01)

(58) Field of Classification Search
  USPC ................. 423/447.3; 977/842; 252/500, 510
  See application file for complete search history.

(56) References Cited

U.S. PATENT DOCUMENTS

| | | | |
|---|---|---|---|
| 4,119,771 | A | 10/1978 | Saridakis |
| 5,985,175 | A | 11/1999 | Fan et al. |
| 7,094,385 | B2 | 8/2006 | Beguin et al. |
| 7,288,870 | B2 | 10/2007 | Mitcham et al. |
| 7,348,101 | B2 | 3/2008 | Gozdz et al. |
| 7,622,059 | B2 | 11/2009 | Bordere et al. |
| 7,999,028 | B2 | 8/2011 | Lin et al. |
| 8,083,905 | B2 | 12/2011 | Choi et al. |
| 8,084,158 | B2 | 12/2011 | Chu et al. |
| 8,293,204 | B2 | 10/2012 | Khodadadi et al. |
| 8,435,676 | B2 | 5/2013 | Zhamu et al. |
| 8,465,871 | B2 | 6/2013 | Juzkow et al. |
| 8,628,747 | B2 | 1/2014 | Zachariah et al. |
| 8,703,092 | B2 | 4/2014 | Ziegler |
| 8,787,001 | B2 | 7/2014 | Fleischer et al. |
| 8,825,178 | B2 | 9/2014 | Feng et al. |
| 8,883,113 | B2 | 11/2014 | Richter et al. |
| 8,974,960 | B2 | 3/2015 | Manthiram et al. |
| 8,986,872 | B2 | 3/2015 | Lev et al. |
| 9,034,421 | B2 | 5/2015 | Mikhaylik et al. |
| 9,167,736 | B2 | 10/2015 | Shah et al. |
| 9,396,829 | B2 | 7/2016 | Mann et al. |
| 9,406,985 | B2 | 8/2016 | Amaratunga et al. |
| 9,450,266 | B2 | 9/2016 | Hosaka et al. |
| 9,502,734 | B1 | 11/2016 | Lim et al. |
| 9,615,473 | B2 | 4/2017 | Kim |
| 9,692,056 | B1 | 6/2017 | Liu et al. |
| 9,711,763 | B2 | 7/2017 | Sohn et al. |
| 9,782,082 | B2 | 10/2017 | Gannon et al. |
| 9,786,872 | B2 | 10/2017 | Suh et al. |
| 9,807,876 | B2 | 10/2017 | Catchpole |
| 9,812,681 | B2 | 11/2017 | Heo |
| 9,859,586 | B2 | 1/2018 | Suh et al. |
| 9,887,644 | B2 | 2/2018 | Kim et al. |
| 9,941,492 | B2 | 4/2018 | Suh et al. |
| 9,972,868 | B2 | 5/2018 | Choi et al. |
| 9,979,225 | B2 | 5/2018 | Bernhard |
| 10,033,031 | B2 | 7/2018 | Wang et al. |
| 10,090,556 | B2 | 10/2018 | Rho et al. |
| 10,096,803 | B2 | 10/2018 | Iseri et al. |
| 10,122,010 | B2 | 11/2018 | Tajima et al. |
| 10,147,915 | B2 | 12/2018 | Song et al. |
| 10,199,851 | B2 | 2/2019 | Hiroki et al. |
| 10,217,971 | B2 | 2/2019 | Takahashi et al. |
| 10,658,651 | B2 | 5/2020 | Pierce et al. |
| 10,957,939 | B2 | 3/2021 | Zhi et al. |
| 2003/0084847 | A1 | 5/2003 | Wood et al. |
| 2003/0099883 | A1 | 5/2003 | Ochoa et al. |
| 2004/0086783 | A1 | 5/2004 | Fong et al. |
| 2004/0234445 | A1 | 11/2004 | Serp et al. |
| 2005/0008778 | A1 | 1/2005 | Utsugi et al. |
| 2005/0063891 | A1 | 3/2005 | Shaffer et al. |
| 2005/0148887 | A1 | 7/2005 | Reiter et al. |
| 2005/0209392 | A1 | 9/2005 | Luo et al. |
| 2005/0221185 | A1 | 10/2005 | Sakata et al. |
| 2006/0039849 | A1 | 2/2006 | Resasco et al. |
| 2006/0078489 | A1 | 4/2006 | Harutyunyan et al. |
| 2006/0116443 | A1 | 6/2006 | Probst et al. |
| 2006/0151318 | A1 | 7/2006 | Park et al. |
| 2006/0228289 | A1 | 10/2006 | Harutyunyan et al. |
| 2006/0245996 | A1 | 11/2006 | Xie et al. |
| 2007/0148962 | A1* | 6/2007 | Kauppinen .......... C01B 32/174 438/689 |
| 2007/0224106 | A1 | 9/2007 | Sakakibara et al. |
| 2007/0274899 | A1 | 11/2007 | Wolf et al. |
| 2008/0131351 | A1 | 6/2008 | Wang et al. |
| 2008/0210550 | A1 | 9/2008 | Walther et al. |
| 2008/0233402 | A1 | 9/2008 | Carlson et al. |
| 2008/0258117 | A1 | 10/2008 | Sakakibara et al. |
| 2009/0117026 | A1 | 5/2009 | Shimazu et al. |
| 2009/0142659 | A1 | 6/2009 | Lai et al. |
| 2009/0208708 | A1 | 8/2009 | Wei et al. |
| 2009/0226704 | A1 | 9/2009 | Kauppinen et al. |
| 2009/0274609 | A1 | 11/2009 | Harutyunyan et al. |
| 2009/0286675 | A1 | 11/2009 | Wei et al. |
| 2009/0317710 | A1 | 12/2009 | Douglas et al. |
| 2010/0000441 | A1 | 1/2010 | Jang et al. |
| 2010/0038602 | A1 | 2/2010 | Plee |
| 2010/0112443 | A1 | 5/2010 | Blomgren et al. |
| 2010/0140560 | A1 | 6/2010 | Wang et al. |
| 2010/0178543 | A1 | 7/2010 | Gruner et al. |
| 2010/0221606 | A1 | 9/2010 | Nalamasu et al. |
| 2010/0276644 | A1 | 11/2010 | Wolf et al. |
| 2010/0285352 | A1 | 11/2010 | Juzkow et al. |
| 2010/0285358 | A1 | 11/2010 | Cui et al. |
| 2011/0060162 | A1 | 3/2011 | Tatsuhara et al. |
| 2011/0096465 | A1 | 4/2011 | Zhou et al. |
| 2011/0111279 | A1 | 5/2011 | Smithyman et al. |
| 2011/0123429 | A1 | 5/2011 | Bordere et al. |
| 2011/0150746 | A1 | 6/2011 | Khodadadi et al. |
| 2011/0158892 | A1 | 6/2011 | Yamaki |
| 2011/0171398 | A1 | 7/2011 | Oladeji |
| 2011/0174519 | A1 | 7/2011 | Shah et al. |
| 2011/0177393 | A1 | 7/2011 | Park et al. |
| 2011/0281156 | A1 | 11/2011 | Boren et al. |
| 2011/0311874 | A1 | 12/2011 | Zhou et al. |
| 2012/0034516 | A1 | 2/2012 | Koo et al. |
| 2012/0105370 | A1 | 5/2012 | Moore |
| 2012/0107683 | A1 | 5/2012 | Kim et al. |
| 2012/0121986 | A1 | 5/2012 | Balu et al. |
| 2012/0132861 | A1 | 5/2012 | Tamamitsu et al. |
| 2012/0138148 | A1 | 6/2012 | Harutyunyan |
| 2012/0141864 | A1 | 6/2012 | Juzkow et al. |
| 2012/0149824 | A1 | 6/2012 | Hooke et al. |
| 2012/0156034 | A1 | 6/2012 | Sabannavar et al. |
| 2012/0177934 | A1 | 7/2012 | Vogel et al. |
| 2012/0193602 | A1 | 8/2012 | Lieber et al. |
| 2012/0219490 | A1 | 8/2012 | Noda et al. |
| 2012/0241666 | A1 | 9/2012 | Hong et al. |
| 2012/0282522 | A1 | 11/2012 | Axelbaum et al. |
| 2012/0295161 | A1 | 11/2012 | Wang et al. |
| 2012/0315539 | A1 | 12/2012 | Lashmore et al. |
| 2012/0321911 | A1 | 12/2012 | Watanabe et al. |
| 2013/0040229 | A1 | 2/2013 | Grigorian et al. |
| 2013/0065125 | A1 | 3/2013 | Sawaki et al. |
| 2013/0065130 | A1 | 3/2013 | Ban et al. |
| 2013/0106026 | A1 | 5/2013 | Wang et al. |
| 2013/0143077 | A1 | 6/2013 | Yebka et al. |
| 2013/0149440 | A1 | 6/2013 | Pyzik et al. |
| 2013/0171485 | A1 | 7/2013 | Kodera et al. |
| 2013/0171496 | A1 | 7/2013 | Wang et al. |
| 2013/0189565 | A1 | 7/2013 | Lashmore et al. |
| 2013/0224551 | A1 | 8/2013 | Hiralal et al. |
| 2013/0256011 | A1 | 10/2013 | Chang et al. |
| 2013/0323583 | A1 | 12/2013 | Phares |
| 2014/0005960 | A1 | 1/2014 | Anderson et al. |
| 2014/0013588 | A1 | 1/2014 | Wang et al. |
| 2014/0021403 | A1 | 1/2014 | Kim et al. |
| 2014/0057178 | A1 | 2/2014 | He et al. |
| 2014/0065447 | A1 | 3/2014 | Liu et al. |
| 2014/0093769 | A1 | 4/2014 | Busnaina et al. |
| 2014/0141248 | A1 | 5/2014 | Noyes |
| 2014/0170490 | A1 | 6/2014 | Izuhara et al. |
| 2014/0178543 | A1 | 6/2014 | Russell et al. |
| 2014/0255782 | A1 | 9/2014 | Jabbour et al. |
| 2014/0287304 | A1 | 9/2014 | Netz |
| 2014/0326181 | A1 | 11/2014 | Kim |
| 2014/0370347 | A1 | 12/2014 | Jung et al. |

(56) References Cited

U.S. PATENT DOCUMENTS

| | | |
|---|---|---|
| 2015/0010788 A1 | 1/2015 | Aria et al. |
| 2015/0037239 A1 | 2/2015 | Sue et al. |
| 2015/0044581 A1 | 2/2015 | Holme et al. |
| 2015/0059571 A1 | 3/2015 | Denton et al. |
| 2015/0064521 A1 | 3/2015 | Watanabe et al. |
| 2015/0087858 A1 | 3/2015 | Ci et al. |
| 2015/0133569 A1 | 5/2015 | Gong et al. |
| 2015/0188112 A1 | 7/2015 | Adre et al. |
| 2015/0200417 A1 | 7/2015 | Song et al. |
| 2015/0207143 A1 | 7/2015 | Wu et al. |
| 2015/0207168 A1 | 7/2015 | Do et al. |
| 2015/0233010 A1 | 8/2015 | Pan et al. |
| 2015/0236366 A1 | 8/2015 | Chang et al. |
| 2015/0243451 A1 | 8/2015 | Kim et al. |
| 2015/0243452 A1 | 8/2015 | Gruner et al. |
| 2015/0255828 A1 | 9/2015 | Momo et al. |
| 2015/0279578 A1 | 10/2015 | Martini et al. |
| 2015/0325820 A1 | 11/2015 | Sohn et al. |
| 2015/0333302 A1 | 11/2015 | Johns et al. |
| 2015/0340684 A1 | 11/2015 | Voillequin et al. |
| 2015/0340741 A1 | 11/2015 | Kim et al. |
| 2015/0349325 A1 | 12/2015 | Chen et al. |
| 2015/0364750 A1 | 12/2015 | Maheshwari et al. |
| 2015/0372344 A1 | 12/2015 | Iwasaki et al. |
| 2015/0380738 A1 | 12/2015 | Zhou et al. |
| 2016/0009557 A1 | 1/2016 | Harutyunyan et al. |
| 2016/0013457 A1 | 1/2016 | Suh et al. |
| 2016/0013458 A1 | 1/2016 | Suh et al. |
| 2016/0020437 A1 | 1/2016 | Sohn et al. |
| 2016/0023905 A1 | 1/2016 | Wei |
| 2016/0036059 A1 | 2/2016 | Tokune et al. |
| 2016/0040780 A1 | 2/2016 | Donahue |
| 2016/0049569 A1 | 2/2016 | Negrin |
| 2016/0079629 A1 | 3/2016 | Abe et al. |
| 2016/0082404 A1 | 3/2016 | Pigos |
| 2016/0094079 A1 | 3/2016 | Hiroki et al. |
| 2016/0126554 A1 | 5/2016 | Beneventi et al. |
| 2016/0149193 A1 | 5/2016 | Seong |
| 2016/0149253 A1 | 5/2016 | Yi et al. |
| 2016/0166837 A1 | 6/2016 | Strommer et al. |
| 2016/0329533 A1 | 11/2016 | Tajima |
| 2016/0365544 A1 | 12/2016 | Lee et al. |
| 2016/0372717 A1 | 12/2016 | Noda |
| 2017/0005504 A1 | 1/2017 | Rho et al. |
| 2017/0018799 A1 | 1/2017 | Jeong |
| 2017/0033326 A1 | 2/2017 | Goto et al. |
| 2017/0040582 A1 | 2/2017 | Kim |
| 2017/0155098 A1 | 6/2017 | Park et al. |
| 2017/0155099 A1 | 6/2017 | Song et al. |
| 2017/0214052 A1 | 7/2017 | Xu |
| 2017/0263972 A1 | 9/2017 | Rho et al. |
| 2017/0288255 A1 | 10/2017 | Kim et al. |
| 2017/0338439 A1 | 11/2017 | Yokoyama |
| 2017/0338449 A1 | 11/2017 | Rho et al. |
| 2017/0338489 A1 | 11/2017 | Miwa et al. |
| 2018/0026236 A1 | 1/2018 | Lee et al. |
| 2018/0062417 A1 | 3/2018 | Choi et al. |
| 2018/0115026 A1 | 4/2018 | Mairs |
| 2018/0240609 A1 | 8/2018 | Park et al. |
| 2018/0241081 A1 | 8/2018 | Deng et al. |
| 2018/0261818 A1 | 9/2018 | Roumi |
| 2018/0309117 A1 | 10/2018 | Zhu et al. |
| 2019/0027638 A1 | 1/2019 | Masuda et al. |
| 2019/0033602 A1 | 1/2019 | Lee et al. |
| 2019/0036103 A1 | 1/2019 | Pierce et al. |
| 2019/0088925 A1 | 3/2019 | Harutyunyan et al. |
| 2019/0099129 A1 | 4/2019 | Kopelman et al. |
| 2019/0115633 A1 | 4/2019 | Akihisa |
| 2019/0122464 A1 | 4/2019 | Delong et al. |
| 2019/0140270 A1 | 5/2019 | Wang et al. |
| 2019/0171315 A1 | 6/2019 | Park et al. |
| 2019/0237748 A1 | 8/2019 | Shin et al. |
| 2019/0393486 A1 | 12/2019 | He et al. |
| 2020/0006772 A1 | 1/2020 | Yu et al. |
| 2020/0264663 A1 | 8/2020 | Kumta et al. |
| 2021/0399289 A1 | 12/2021 | Eshraghi et al. |

FOREIGN PATENT DOCUMENTS

| | | |
|---|---|---|
| CN | 101627494 A | 1/2010 |
| CN | 101801394 A | 8/2010 |
| CN | 101809790 A | 8/2010 |
| CN | 102047488 A | 5/2011 |
| CN | 102482098 A | 5/2012 |
| CN | 102593436 A | 7/2012 |
| CN | 102674316 A | 9/2012 |
| CN | 102856579 A | 1/2013 |
| CN | 102945947 A | 2/2013 |
| CN | 103204492 A | 7/2013 |
| CN | 102674316 B | 5/2014 |
| CN | 104064725 A | 9/2014 |
| CN | 204072059 U | 1/2015 |
| CN | 104752651 A | 7/2015 |
| CN | 103219467 B | 11/2015 |
| CN | 103715394 B | 1/2016 |
| CN | 105513823 A | 4/2016 |
| CN | 205375473 U | 7/2016 |
| CN | 103280846 B | 8/2016 |
| CN | 106024969 A | 10/2016 |
| CN | 205697720 U | 11/2016 |
| CN | 106299237 A | 1/2017 |
| CN | 104392845 B | 3/2017 |
| CN | 106602012 A | 4/2017 |
| CN | 104362326 B | 8/2017 |
| CN | 107004827 A | 8/2017 |
| CN | 107074534 A | 8/2017 |
| CN | 107086306 A | 8/2017 |
| CN | 107611340 A | 1/2018 |
| CN | 108878717 A | 11/2018 |
| CN | 109088071 A | 12/2018 |
| CN | 208690415 U | 4/2019 |
| CN | 106129536 B | 7/2019 |
| DE | 102017123752 B3 | 3/2019 |
| EP | 2 213 369 A1 | 8/2010 |
| EP | 2 476 648 A1 | 7/2012 |
| EP | 2 835 177 A1 | 2/2015 |
| JP | 6-267515 A | 9/1994 |
| JP | 11-31502 A | 2/1999 |
| JP | 11-87875 A | 3/1999 |
| JP | 2005-272277 A | 10/2005 |
| JP | 2007-49789 A | 2/2007 |
| JP | 2008-305608 A | 12/2008 |
| JP | 2010-277925 A | 12/2010 |
| JP | 2012-512956 A | 6/2012 |
| JP | 2015-105208 A | 6/2015 |
| JP | 2015-521347 A | 7/2015 |
| JP | 2015-220004 A | 12/2015 |
| JP | 2016-25077 A | 2/2016 |
| JP | 2016-31922 A | 3/2016 |
| JP | 2016-54113 A | 4/2016 |
| JP | 2016-73196 A | 5/2016 |
| JP | 2017-130274 A | 7/2017 |
| JP | 2017-147222 A | 8/2017 |
| JP | 2017-162637 A | 9/2017 |
| KR | 10-2007-0001220 A | 1/2007 |
| KR | 10-1548465 B1 | 8/2015 |
| KR | 10-2016-0047643 A | 5/2016 |
| KR | 10-1632109 B1 | 6/2016 |
| KR | 10-2016-0114389 A | 10/2016 |
| KR | 10-2016-0127641 A | 11/2016 |
| KR | 10-2016-0129440 A | 11/2016 |
| KR | 10-2016-0129500 A | 11/2016 |
| KR | 10-1676641 B1 | 11/2016 |
| KR | 10-1703516 B1 | 2/2017 |
| KR | 10-2017-0036478 A | 4/2017 |
| KR | 10-2017-0037510 A | 4/2017 |
| KR | 10-1729702 B1 | 4/2017 |
| KR | 10-1765459 B1 | 8/2017 |
| KR | 10-1795544 B1 | 11/2017 |
| KR | 10-2019-0040554 A | 4/2019 |
| WO | WO 2005/052053 A1 | 6/2005 |
| WO | WO 2005/096089 A1 | 10/2005 |

(56) References Cited

FOREIGN PATENT DOCUMENTS

| | | | |
|---|---|---|---|
| WO | WO 2012/156297 A2 | 11/2012 | |
| WO | WO 2013/052704 A1 | 4/2013 | |
| WO | WO 2014/102131 A2 | 7/2014 | |
| WO | WO 2014/153465 A1 | 9/2014 | |
| WO | WO 2015/100762 A1 | 7/2015 | |
| WO | WO 2016/031335 A1 | 3/2016 | |
| WO | WO 2016/178210 A1 | 11/2016 | |
| WO | WO 2017/052248 A1 | 3/2017 | |
| WO | WO 2017/083566 A1 | 5/2017 | |
| WO | WO 2017/120391 A1 | 7/2017 | |
| WO | WO 2017/131451 A1 | 8/2017 | |
| WO | WO 2017/199884 A1 | 11/2017 | |
| WO | WO 2018/110933 A1 | 6/2018 | |
| WO | WO-2018110776 A1 * | 6/2018 | ........... C01B 32/168 |
| WO | WO 2018/194414 A1 | 10/2018 | |
| WO | WO 2018/194415 A1 | 10/2018 | |
| WO | WO 2019/027147 A1 | 2/2019 | |

OTHER PUBLICATIONS

Shan Jiang et al., "Series in Science Communication by Chinese Academy of Sciences: Nanometer", Popular Science Press, pp. 155-157, Sep. 2013.(Cited in CN Application No. 201710150360.3, dated May 6, 2022).
Yurong Liu, "Applications of Carbon Materials in Supercapacitor", National Defense Industry Press,(p. 142, 2 pages total), Jan. 2013. (Cited in CN Application No. 201710150360.3, dated May 6, 2022).
Communication dated Dec. 22, 2020, from the Japanese Patent Office in related application No. 2020-002026.
David Schiller, "Development of a Stretchable Battery Pack for Wearable Applications", submitted by David Schiller, BSc., Johannes Kepler University Linz, Nov. 2019, 28 Pages Total, https://epub.jku.at/obvulihs/content/titleinfo/4605900/full.pdf.
International Search Report and Written Opinion, issued by International Searching Authority in related International Application No. PCT/US2020/043017, dated Dec. 14, 2020.
A. Weidenkaff et al. "Metal Nanoparticles for the Production of Carbon Nanotube Composite Materials by Decomposition of Different Carbon Sources" Materials Science and Engineering C, vol. 19, pp. 119-123, 2002.
A.J. Clancy et al., "A One-Step Route to Solubilised, Purified or Functionalised Single-Walled Carbon Nanotunes", Journal of Materials Chemistry A, pp. 16708-16715, 2015.
Beate Krause et al., "Disperability and Particle Size Distribution of CNTs in an Aqeous Surfactant Dispersion as a Function of Ultrasonic Treatment Time" Carbon 48, pp. 2746-2754, 2010.
Chee Howe See et al., "CaCO3 Supported Co—Fe Catalysts for Carbon Nanotube Synthesis in Fluidized Bed Reactors" Particle Technology and Fluidization, vol. 54, No. 3, pp. 657-664, Mar. 2008.
Communication dated Jul. 31, 2019, from the European Patent Office in related European Application No. 18194454.7.
Danafar, F. et al., "Fluidized bed catalytic chemical vapor deposition synthesis of carbon nanotubes—a review," The Chemical Engineering Journal, vol. 155, pp. 37-48, 2009.
Dunens, O., et al., "Synthesis of Multiwalled Carbon Nanotubes on Fly Ash Derived Catalysts," Environ. Sci. Technol., vol. 43, pp. 7889-7894, 2009.
Extended European Search Report issued in related European Application No. 18184002.6 dated Nov. 30, 2018.
Extended European Search Report issued in related European Patent Application No. 18194469.5 dated Dec. 4, 2018.
Hasegawa Kei et. al., "Lithium Ion Batteries Made of Electrodes with 99 wt% active materials and 1wt% carbon nanotubes without binder or metal foils", Journal of Power Sources, vol. 321, pp. 155-162, 2016.
Howard Wang, "Dispersing Carbon Nanotubes Usuing Surfactants" Current Opinion in Colloid & Interface Science 14, pp. 364-371, 2009.
Hu, Liangbing et al., Thin, Flexible Secondary Li-Ion Paper Batteries, ACS Nano, vol. 4, No. 10, pp. 5843-5848, 2010.
International Search Report and Written Opinion, issued by International Searching Authority in related International Application No. PCT/US19/49923, dated Jan. 23, 2020.
Jenax Inc., Flexible Lithium Polymer Battery J . FLEX, Copyright 2014, (6 Pages Total).
Joo-Seong Kim et al., Supporting Information, a Half Millimeter Thick Coplanar Flexible Battery with Wireless Recharging Capability, Nano Letters 2015 15 (4), 9 Pages Total, (2015).
Kim et al., "A Half Millimeter Thick Coplanar Flexible Battery with Wireless Recharging Capability", Nano Letters, American Chemical Society, 2015, (9 Pages Total).
Kun Kelvin Fu et al., "Flexible Batteries: From Mechanics to Devices", 2016 American Chemical Society, ACS Publications, ACS Energy Letters 1, pp. 1065-1079, (2016).
Linqin Jiang et al., "Production of Aqueous Colloidal Dispersions of Carbon Nanotubes", Journal of Colloid and Interface Science, pp. 89-94, 2003.
Luo Shu et al., "Binder-Free LiCoO2/Carbon Nanotube Cathodes for High-Performance Lithium Ion Batteries" Advanced Materials, vol. 24, pp. 2294-2298, 2012.
Nanalyze., a Flexible Battery from Blue Spark Technologies, Apr. 8, 2014, (4 Pages Total).
Panasonic Corp., Panasonic Develops Bendable, Twistable, Flexible Lithium-ion Battery, Sep. 29, 2016, (8 Pages Total).
ProLogium Technology Co., Ltd., FLCB Flexible Type LCB, Copyright 2015, (6 Pages Total).
Pu et al., "A Self-Charging Power Unit by Integration of a Textile Triboelectric Nanogenerator and a Flexible Lithium-Ion Battery for Wearable Electronics", Advanced Materials. 2015, (2015), (7 Pages Total).
Sarah Maghsoodi et al., "A Novel Continuous Process for Synthesis of Carbon Nanotubes Using Iron Floating Catalyst and MgO Particles for CVD of methane in a fluidized bed reactor" Applied Surface Science, vol. 256, pp. 2769-2774, 2010.
Sau Yen Chew et al., "Flexible free-standing carbon nanotube films for model lithium-ion batteries", Carbon 47, pp. 2976-2983, (2009).
Sebastian Anthony, LG produces the first flexible cable-type lithium-ion battery, ExtremeTech, Aug. 30, 2012, (9 Pages Total).
Sheng Xu et al., "Stretchable batteries with self-similar serpentine interconnects and integrated wireless recharging systems," Nature communications 4:1543, DOI: 10.1038/ncomms2553, 8 Pages Total, (2013).
Shu Luo et al., "Binder-Free LiCoO2/ Carbon Nanotube Cathodes for High-Performance Lithium Ion Batteries", Advanced Materials 24, pp. 2294-2298, (2012).
Extended European Search Report issued in related European Patent Application No. 18186402.6 dated Oct. 11, 2018.
The Swatch Group Ltd., A revolutionary battery by Belenos: the Watchmaker Swatch Group Has Signed an Agreement With the Chinese Geely Group for Use of Its Innovative New Battery., as accessed on May 29, 2019, (3 Pages Total), https://www.swatchgroup.com/en/swatch-group/innovation-powerhouse/industry-40/revolutionary-battery-belenos.
Vishwam Sankaran., Samsung is reportedly developing a curved battery for its foldable phone, Jul. 4, 2018, (4 Pages Total).
Wang Ke et al., "Super-Aligned Carbon Nanotube Films as Current Collectors for Lightweight and Flexible Lithium Ion Batteries" Advanced Functional Materials, vol. 23, pp. 846-853, 2013.
Xian-Ming Liu et al., "Carbon nanotube (CNT)-based composites as electrode material for rechargeable Li-ion batteries: a review", Composite Science and Technology, vol. 72, pp. 121-144, (2012).
Zhao, M.Q. et al., "Towards high purity graphene/single-walled carbon nanotube hybrids with improved electrochemical capacitive performance," Carbon, vol. 54, pp. 403-411, 2013.
Zhiqian Wang et al., "Fabrication of High-Performance Flexible Alkaline Batteries by Implementing Multiwalled Carbon Nanotubes and Copolymer Separator" Advanced Materials 26, pp. 970-976, (2014).
Zhiqiang Niu et al., "A "skeleton/skin" strategy for preparing ultrathin free-standing single-walled carbon nanotube/polyaniline (56) References Cited

OTHER PUBLICATIONS films for high performance supercapacitor electrodes", the Royal Society of Chemistry 2012, Energy & Environmental Science 5, pp. 8726-8733, (2012).
Communication dated Aug. 26, 2019, from the European Patent Office in related European Application No. 18186402.6.
Communication issued by International Searching Authority in related International Application No. PCT/US19/49923, dated Nov. 13, 2019 (PCT/ISA/206).
Extended European Search Report issued in related European Patent Application No. 18173644.8 dated Oct. 12, 2018.
Extended Search Report of related EP Application No. 18 19 4454 dated Jul. 23, 2019.
International Search Report and Written Opinion, issued by International Searching Authority in related International Application No. PCT/US2020/020993, dated Jul. 2, 2020.
International Search Report and Written Opinion, issued by International Searching Authority in related International Application No. PCT/US2020/039821, dated Sep. 30, 2020.
O.M. Marago, et al., "Optical trapping of carbon nanotubes", Physica E, 40 (2008), pp. 2347-2351.
Xiong Pu et al., "A Self-Charging Power Unit by Integration of a Textile Triboelectric Nanogenerator and a Flexible Lithium-Ion Battery for Wearable Electronics", Advanced Materials 27, pp. 2472-2478, (2015).
Office Action issued by the European Patent Office in related European Patent Application No. 18184002.6, dated May 13, 2020.
Communication dated Feb. 4, 2020, from the European Patent Office in counterpart European Application No. 18 173 644.8.
Communication dated Oct. 19, 2022, from the State Intellectual Property Office of People's Republic of China in Application No. 201811076414.7.
Office Action dated Jun. 28, 2022, issued by the Korean Patent Office in Korean Application No. 10-2022-0057879.
Communication dated Feb. 23, 2022, from the State Intellectual Property Office of People's Republic of China in Application No. 202010079226.0.
Communication dated Jan. 6, 2021, from the Japanese Patent Office in related application No. 2020-002545.
Communication dated Oct. 9, 2022, from the Chinese Patent Office in Chinese Application No. 202010002766.9.
Aminy E. Oslfeld et al., "High-performance flexible energy storage and harvesting system for wearable electronics", www.nature.com/scientificreports, Scientific Reports, 6:26122,DOI:10.1038/srep26122, (2016), (10 Pages Total).
Communication dated Nov. 9, 2021, from the Japanese Patent Office in related application No. 2018-172178.
Cha, Seung I., et al., "Mechanical and electrical properties of cross-linked carbon nanotubes." Carbon 46.3 (2008): pp. 482-488 (Year: 2008).
Communication dated Mar. 22, 2022, from the State Intellectual Property Office of People's Republic of China in Application No. 201811076414.7.
Communication dated Sep. 26, 2021, issued by the Korean Intellectual Property Office in related Korean Application No. 10-2018-0058433.
Communication dated Jan. 27, 2022, from the State Intellectual Property Office of People's Republic of China in related Application No. 201710150360.3.
Notice of Reasons for Rejection dated Aug. 17, 2021, from the Japanese Patent Office in related application No. 2020-002545.
Notification of the First Office Action dated Jul. 16, 2021, from the State Intellectual Property Office of People's Republic of China in related Application No. 201710151455.7.
First Office Action dated Aug. 25, 2022, from the State Intellectual Property Office of People's Republic of China in Application No. 201810503719.5.
Ling-ling Gu et al., "Preparation and Applications of Carbon Nanotube/Polymer Composites", Polymer Materials Science and Engineering, vol. 25 ,No. 11, (Nov. 2009), (5 Pages Total, abstract on p. 5).
Communication dated Mar. 22, 2022, from the Japanese Patent Office in application No. 2018-142355.
Ying Shi et al., "Graphene-based integrated electrodes for flexible lithium ion batteries", 2D Materials 2 (2015): 024004. (Year: 2015), (9 Pages Total).
Fenghua Su et al., "High-Performance Two-Ply Yarn Supercapacitors Based on Carbon Nanotube Yarns Dotted with CO3O4 and NiO Nanoparticles", Small 2015, 11, No. 7, pp. 854-861 with Supporting Information(12 Pages Total), www.small-journal.com, (Year: 2015).
Aminy E. Ostfeld et al., "High-performance flexible energy storage and harvesting system for wearable electronics", www.nature.com/scientificreports, Scientific Reports, 6:26122,DOI:10.1038/srep26122, (2016), (10 Pages Total).
Communication dated Jul. 27, 2021, issued by the Korean Intellectual Property Office in related Korean Application No. 10-2020-0005929.
Sungmook Jung et al., "Wearable Fall Detector using Integrated Sensors and Energy Devices", www.nature.com/scientificreports, Scientific Reports, 5:17081, DOI: 10.1038/srep17081, (2015), (9 Pages Total).
Ye, Huating, et al., "A true cable assembly with a carbon nanotube sheath and nickel wire core: a fully flexible electrode integrating energy storage and electrical conduction", Journal of Materials Chemistry A 2018; 6: pp. 1109-1118, The Royal Society of Chemistry, (2018).
Communication dated Feb. 28, 2023 from the Japanese Patent Office in application No. 2021-509213.
Communication dated Nov. 11, 2022, from the Chinese Patent Office in Chinese Application No. 202010079226.0.
Mallakpour et al., "Carbon nanotube-metal oxide nanocomposites: Fabrication, properties and applications," Chemical Engineering Journal, 2016, vol. 302, pp. 344-367.
Shah et al., "A Layered Carbon Nanotube Architecture for High Power Lithium Ion Batteries," Journal of the Electrochemical Society, 2014, vol. 161, No. 6, pp. A989-A995.

* cited by examiner

FIG. 1

```
┌─────────────┐   ┌─────────────┐   ┌─────────────┐   ┌─────────────┐
│ Inject      │   │ Produce     │   │ Inject      │   │ Produce     │
│ catalyst    │   │ catalyst    │   │ carbon      │   │ aerosol     │
│ and/or      │──▶│ from        │──▶│ source into │──▶│ of SWNTS in │
│ catalyst    │   │ catalyst    │   │ reactor     │   │ reactor     │
│ precursor   │   │ precursor   │   │             │   │             │
│ into reactor│   │ in reactor  │   │             │   │             │
└─────────────┘   └─────────────┘   └─────────────┘   └─────────────┘
                                                              │
                                                              ▼
                       ┌─────────────┐              ┌─────────────┐
                       │ Mix aerosol │              │ Transmit    │
                       │ with matrix │              │ aerosol     │
                       │ to produce  │◀─────────────│ from reactor│
                       │ dispersion  │              │ to mixer    │
                       │ of SWNTs in │              │ containing  │
                       │ matrix      │              │ matrix      │
                       └─────────────┘              └─────────────┘
```

FIG. 2

PRODUCTION OF CARBON NANOTUBE MODIFIED BATTERY ELECTRODE POWDERS VIA SINGLE STEP DISPERSION

CROSS-REFERENCE TO RELATED APPLICATIONS

This application is a continuation of U.S. patent application Ser. No. 15/604,131, entitled "Production of Carbon Nanotube Modified Battery Electrode Powders via Single Step Dispersion," filed on May 24, 2017, the contents of which is expressly incorporated by reference herein in its entirety.

FIELD

The present disclosure relates generally to a method of making single walled carbon nanotubes (SWNTs). The method includes a single step for preparing a homogeneous dispersion of SWNTs in a battery electrode powder.

BACKGROUND

SWNTs provide numerous benefits for use in, for example, electrically and thermally conducting functional materials. In many cases, SWNTs are dispersed in a battery electrode powder material to produce carbon-reinforced composite materials, which often possess improved properties relative to the corresponding non-composite materials.

However, current dispersion technologies are not only expensive but also degrade nanotube properties, leading to reduction of aspect ratio and introduction of defects. The technologies end up requiring more nanotube loading (in terms of weight percent) for improved performance. In addition, current technologies often result in high levels of SWNT agglomeration within the composite materials.

There is thus a need in the art for a more efficient method for preparing SWNT-containing dispersions that preferably reduce SWNT agglomeration.

SUMMARY

The present disclosure relates generally to methods of making SWNTs which, for example, may be used as additives in composite materials, such as for use in battery electrodes. In particular, the present disclosure provides a single step method for preparing a homogeneous dispersion of SWNTs in a battery electrode powder. The method may comprise providing a reactor in fluid communication with a mixer, wherein an aerosol containing SWNTs is transmitted from the reactor directly to the mixer containing a battery electrode powder.

Aspects of the present disclosure also relate to SWNTs, SWNT-containing dispersions, and composite materials including the SWNTs obtainable by the methods disclosed herein. Further, aspects of the present disclosure also relate to apparatuses for preparing SWNT-containing dispersions as described herein.

DETAILED DESCRIPTION OF THE INVENTION

The present disclosure relates generally to methods of making SWNTs which, for example, may be used as additives in composite materials, such as for use in battery electrodes. In particular, the present disclosure provides a single step method for preparing a homogeneous dispersion of SWNTs in a battery electrode powder. The method may comprise providing a reactor in fluid communication with a mixer, wherein an aerosol containing SWNTs is transmitted from the reactor directly to the mixer containing a battery electrode powder.

The method of the present disclosure comprises providing a reactor for preparing an aerosol of SWNTs. According to some aspects, the reactor is configured for use with a chemical vapor deposition (CVD) method for the preparation of SWNTs.

Figure 1:
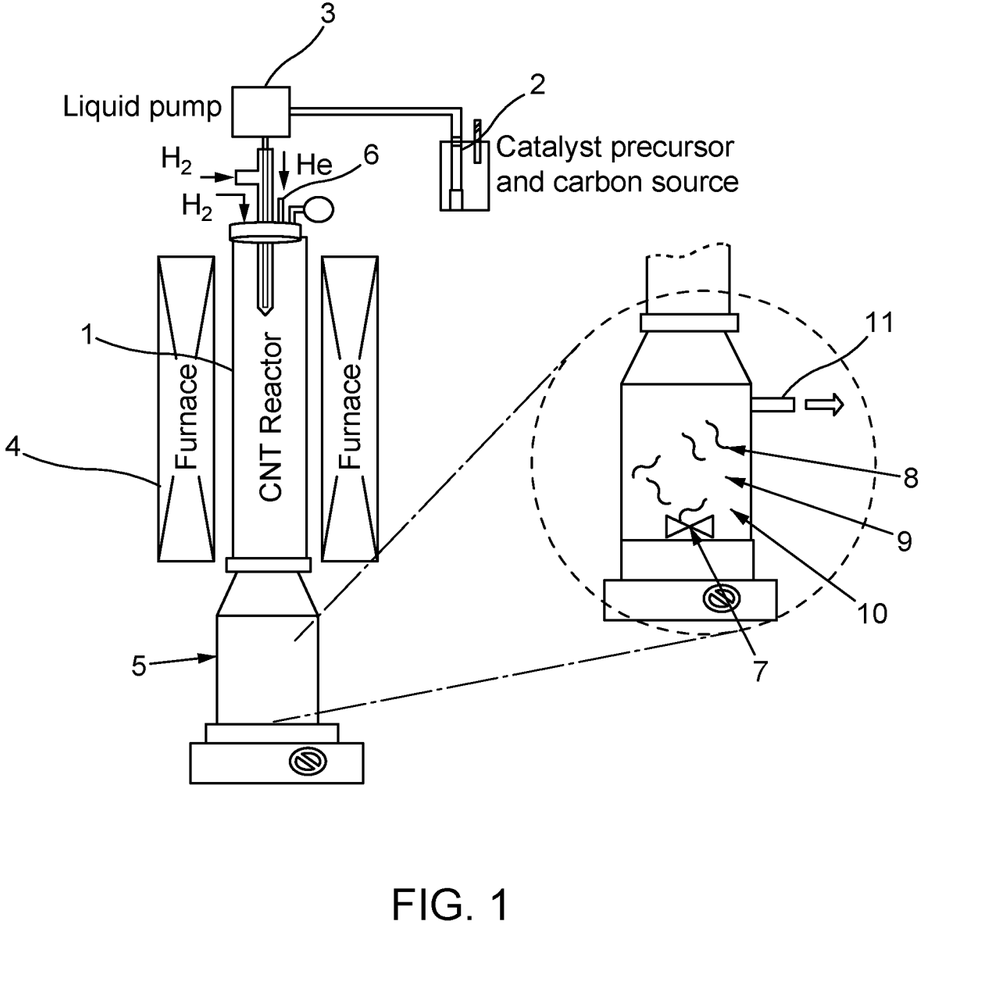
FIG. 1 shows an example apparatus for preparing SWNT-containing dispersions according to aspects of the present invention.
Figure 2:
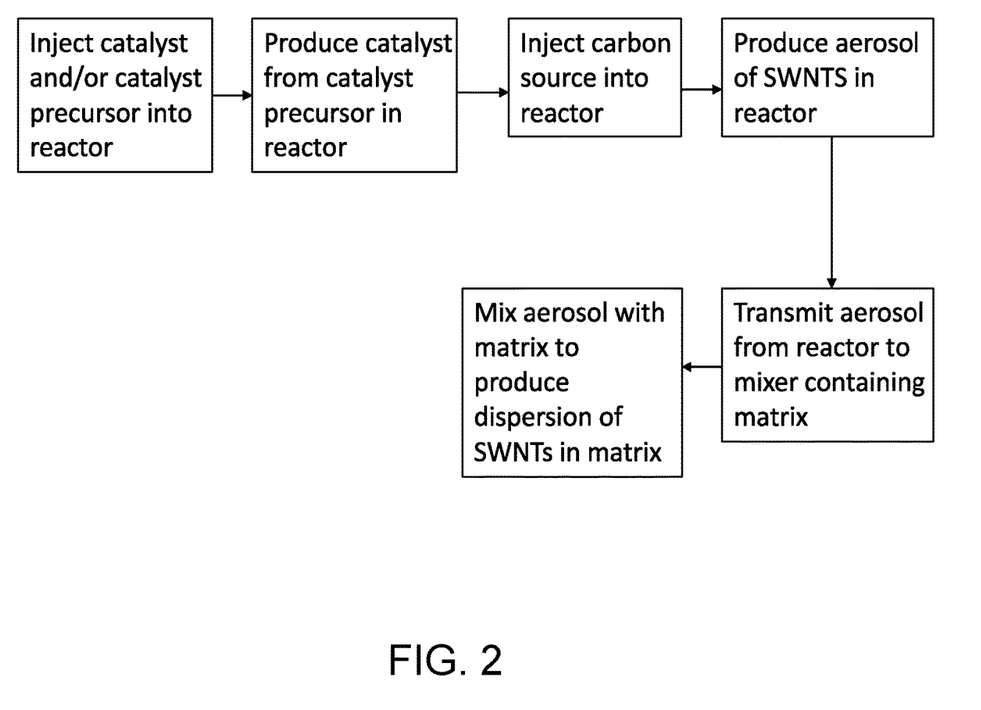
FIG. 2 shows a flowchart depicting an example method for preparing SWNT-containing dispersions according to aspects of the present invention.

The reactor may be in fluid communication with a source of catalyst and/or catalyst precursor and a carbon source. For example, as shown in FIG. 1, the reactor 1 may be in fluid communication with a source chamber 2, the source chamber 2 being configured to house a catalyst and/or catalyst precursor and/or a carbon source. According to some aspects, the reactor may be in fluid communication with one or more source chambers. For example, the catalyst and/or catalyst precursor and/or the carbon source gas may be housed in different or the same source chambers.

The method may comprise injecting the catalyst and/or catalyst precursor and the carbon source into the reactor. For example, the reactor may be provided with a first inlet for injecting the catalyst and/or catalyst precursor from the source chamber to the reactor. The first inlet may be in communication with, for example, a liquid pump 3 as shown in FIG. 1, which may pump the catalyst and/or catalyst precursor from the source chamber 2 to the reactor 1.

As used herein, the term "catalyst" refers to a component that provokes or speeds up a chemical reaction, for example, the synthesis of SWNTs. The catalyst may comprise, for example, a metal. Examples of metals include, but are not limited to, transition metals, lanthanide metals, actinide metals, and combinations thereof. For example, the catalyst may comprise a transition metal such as chromium (Cr), molybdenum (Mo), tungsten (W), iron (Fe), cobalt (Co), nickel (Ni), ruthenium (Ru), rhodium (Rh), palladium (Pd), osmium (Os), iridium (Ir), copper (Cu), silver (Ag), gold (Au), cadmium (Cd), scandium (Sc), yttrium (Y), lanthanum (La), platinum (Pt), and/or combinations thereof.

According to some aspects, a catalyst precursor may be injected into the reactor, either in place of or in combination with a catalyst. As used herein, the term "catalyst precursor" refers to a component that can be converted into an active catalyst. Examples of catalyst precursors include, but are not limited to, transition metal salts, such as a nitrate, acetate, citrate, chloride, fluoride, bromide, iodide, and/or hydrates thereof. For example, the catalyst precursor may be a metallocene, a metal acetylacetonate, a metal phthalocyanine, a metal porphyrin, a metal salt, a metalorganic compound, a metal sulfate, a metal hydroxide, a metal carbonate, or a combination thereof.

According to some aspects, a catalyst may be produced from the catalyst precursor inside the reactor. For example, after the catalyst precursor has been injected into the reactor, a component or all of the catalyst precursor, such as a metal, may be reduced into an active catalyst prior to the production of SWNTs. The reactor may comprise a first region wherein the catalyst may be produced.

According to some aspects, the catalyst and/or catalyst precursor may be provided as a nanoparticle. For example, the catalyst and/or catalyst precursor may have a diameter from about 0.01 to 500 nm, preferably from about 0.01 to 250 nm, even more preferably from about 0.05 to 200 nm, and most preferably from about 0.5 to 100 nm.

According to some aspects, the catalyst and/or catalyst precursor may be injected into the reactor as a liquid, spray, or aerosol. For example, the catalyst and/or catalyst precursor may be mixed with a first carrier gas, such as an inert gas, prior to injection into the reactor. Examples of inert gasses include, but are not limited to, argon gas, hydrogen gas, helium gas, nitrogen gas, and mixtures thereof. For example, as shown in FIG. 1, the catalyst and/or catalyst precursor may be combined with hydrogen gas prior to injection into the reactor.

The method may also comprise injecting the carbon source into the reactor. According to some aspects, the reactor may be provided with a second inlet for injecting the carbon source from the source chamber to the reactor. The second inlet may be the same or different from the first inlet. The second inlet may be in communication with a liquid pump, which may pump the carbon source from the source chamber to the reactor.

Examples of carbon sources include, but are not limited to, a hydrocarbon, an alcohol, an ester, a ketone, an aromatic, an aldehyde, and a combination thereof. For example, the carbon source may be selected from xylene, propane, butane, butene, ethylene, ethanol, carbon monoxide, butadiene, pentane, pentene, methane, ethane, acetylene, carbon dioxide, naphthalene, hexane, cyclohexane, benzene, methanol, propanol, propylene, commercial fuel gases (such as liquefied petroleum gas, natural gas, and the like), and combinations thereof.

According to some aspects, the carbon source may be injected as a liquid, spray, or aerosol. For example, the carbon source may be mixed with a second carrier gas, wherein the second carrier gas is the same or different than the first carrier gas. The carbon source may be injected into the reactor before, after, or simultaneously with the catalyst and/or catalyst precursor.

According to some aspects, an aerosol of SWNTs may be produced in the reactor. For example, the carbon source may decompose at the surface of the catalyst particles in the reactor by thermal and/or catalytic decomposition, thereby resulting in the formation and/or growth of SWNTs.

According to some aspects, the temperature of the reactor may be maintained and/or varied using one or more heat sources, such as a furnace. As shown in FIG. 1, the furnace 4 may be proximal to the reactor 1. For example, the furnace 4 may be proximal to one, two, or more sides of one or more portions of reactor 1, or may completely surround one or more portions of reactor 1.

The one or more heat sources may maintain the temperature of the reactor 1 at a temperature suitable for one or more of the reactions described herein. For example, the furnace 4 may maintain the temperature of the reactor at a temperature suitable for reducing the catalyst precursor into active catalyst and/or for the synthesis and/or formation of SWNTs.

According to some aspects, different regions of the reactor 1 may be maintained at different temperatures. For example, the first region of the reactor may be maintained at a temperature suitable for reducing the catalyst precursor into active catalyst and a second region of the reactor may be maintained at a temperature suitable for the synthesis and/or growth of SWNTs. According to some aspects, each region of the reactor 1 may be heated by the same and/or different heat sources.

According to some aspects, the one or more heat sources may maintain the temperature of the reactor at a temperature of between about 200 and 1600° C.

The SWNTs may be present in the reactor as an aerosol. The method may comprise directly transmitting the SWNT-containing aerosol from the reactor to a mixer, the mixer comprising a battery electrode powder. For example, as shown in FIG. 1, a mixer 5 may be provided in fluid communication with the reactor 1. The mixer 5 may be above, below, or beside the reactor 1. According to some aspects, the aerosol may be continuously introduced to the mixer as the SWNTs are synthesized. Alternatively, the SWNT-containing aerosol may be introduced to the mixer once a portion or all of the SWNTs have been synthesized.

According to some aspects, the battery electrode powder may be any material capable of providing a dispersed SWNT material. For example, the battery electrode powder may comprise a primary battery electrode powder material. As used herein, the term "primary battery electrode powder material" refers to the most prominent material present in the battery electrode powder, such as the material having the highest weight percentage of all the materials making up the battery electrode powder. According to some aspects, the primary battery electrode powder material may comprise a liquid such as a metal alloy, a carbon pitch, a solution of dispersed graphene or graphene oxide sheets, a tar, a cement, an asphalt, an ionic liquid selected from a imidazolium-based liquid, an organic solvent (for example, N,N-dimethylformamide or n-methylpyrrolidone), a melted polymer (for example, a melted polyester, epoxy, polyimide, organosilicone, nylon, Teflon, polystyrene, polyethylene, or a combination thereof), or a combination thereof.

According to some aspects, the battery electrode powder may also comprise one or more secondary battery electrode powder materials. As used herein, the term "secondary battery electrode powder material" refers to one or more components of the battery electrode powder present in lesser amounts than the primary battery electrode powder material.

According to some aspects, the secondary battery electrode powder material may comprise a surfactant, such as an anionic surfactant. Examples of anionic surfactants include, but are not limited to, sodium dodecyl sulfate (SDS), salts of carboxylic acids, salts of sulfonic acids, salts of sulfuric acid, dodecyltrimethylammonium bromide, sodium octylbenzene sulfonate, phosphoric and polyphosphoric acid esters, alkylphosphates, monoalkyl phosphate (MAP), sodium butylbenzene sulfonate, sodium benzoate, and salts of perfluorocarboxylic acids.

According to some aspects, the secondary material may comprise a binder. Examples of binders include, but are not limited to, fluorine resins (for example, polytetrafluoroethylene (PTFE) or polyvinylidene fluoride (PVdF)), polyacrylonitrile (PAN), polyimide resins, acrylic resins, polyolefin resins, or a combination thereof.

According to some aspects, the SWNT-containing aerosol may comprise one or more carrier gasses that carry the SWNTs from the reactor to the mixer. For example, the carrier gasses may be the same as the first and/or second carrier gas used to inject the catalyst and/or catalyst precursor and/or the carbon source into the reactor. According to some aspects, an additional carrier gas may be injected into or already present in the reactor. The additional carrier gas may be the same or different from the first and/or second carrier gas. For example, as shown in FIG. 1, the reactor may comprise a carrier gas inlet 6 wherein an additional carrier gas, such as a helium gas, is injected into the reactor. According to some aspects, the mixer 5 may be provided with an outlet 11 to allow the one or more carrier gasses to be released as the SWNTs are dispersed within the battery electrode powder.

The method comprises dispersing the SWNTs in the battery electrode powder. For example, the mixer may be provided with a dispersing component, such as a mechanical stirrer, a magnetic stirrer, a ball miller, a sonicator, or a combination thereof. For example, as shown in FIG. 1, the mixer 5 may include a stirrer 7 configured to disperse the SWNTs 8 in a battery electrode powder comprising the primary battery electrode powder material 9 and the secondary materials 10. According to some aspects, the SWNTs may be transmitted to the mixer under constant stirring.

According to some aspects, the amount of any of the components herein may be selected in order to provide a specific ratio of SWNT to battery electrode powder. The specific ratio may be selected in order to provide a low instance of SWNT agglomeration in the battery electrode powder. For example, the ratio of SWNT to battery electrode powder by weight may be from about 0.01 to 100 wt %, preferably from about 0.01 to 80 wt %, more preferably from about 0.01 to 65 wt %, and most preferably from about 0.01 to 50 wt %.

According to some aspects, the method may also optionally comprise mixing the resultant dispersion with an active material and/or making a slurry comprising the dispersion using commonly established methods.

The present disclosure also relates to SWNTs, SWNT-containing dispersions, and composite materials including the SWNTs and/or SWNT-containing dispersions obtainable by the methods disclosed herein. For example, the present disclosure relates to battery electrodes comprising the composite materials described herein.

The present disclosure also relates to an apparatus for preparing SWNT-containing dispersions as described herein. It should be understood that the elements of the apparatus described herein may be arranged in various ways (e.g., above, below, beside one another) so long as they do not depart from the functionalities described herein.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

The invention claimed is:

1. A method for preparing a dispersion of single walled carbon nanotubes in a battery electrode powder, the method comprising:
    preparing an aerosol containing single walled carbon nanotubes in a reactor; and
    transmitting the aerosol directly from the reactor to a mixer containing the battery electrode powder to produce the dispersion,
    wherein the battery electrode powder comprises a primary battery electrode powder material and a secondary material, the secondary material comprising a binder, and
    wherein the binder is selected from the group consisting of fluorine resins, polyimide resins, acrylic resins, polyolefin resins, and combinations thereof.

2. The method according to claim 1, wherein a ratio of the single walled carbon nanotubes to the battery electrode powder is from about 0.01 to 80 wt %.

3. The method according to claim 2, wherein the ratio of the single walled carbon nanotubes to the battery electrode powder is from about 0.01 to 50 wt %.

4. The method according to claim 1, wherein the primary battery electrode powder material further comprises an organic solvent.

5. The method according to claim 4, wherein the organic solvent comprises n-methylpyrrolidone.

6. The method according to claim 1, wherein the primary battery electrode powder material further comprises a surfactant.

7. The method according to claim 6, wherein the surfactant comprises sodium dodecyl sulfate.

8. The method according to claim 1, wherein the battery electrode powder is continually mixed as the aerosol is transmitted to the mixer.

9. The method according to claim 8, wherein the battery electrode powder is continually mixed by a mechanical stirrer, a magnetic stirrer, a ball miller, a sonicator, or a combination thereof provided as part of the mixer.

10. The method according to claim 1, wherein the aerosol is continuously transmitted to the mixer as the single walled carbon nanotubes are produced in the reactor.

11. The method according to claim 1, wherein the single walled carbon nanotubes are produced by contacting a carbon source and a catalyst in the reactor.

12. The method according to claim 11, wherein the catalyst comprises a metal.

13. The method according to claim 11, wherein a catalyst precursor is converted to the catalyst in the reactor.

14. The method according to claim 11, wherein the catalyst comprises nanoparticles.

15. The method according to claim 1, wherein the aerosol comprises a first carrier gas.

16. The method according to claim 15, wherein the single walled carbon nanotubes are produced by contacting a carbon source and a catalyst in the reactor, and wherein the catalyst is mixed with a second carrier gas.

17. The method according to claim 16, wherein the first carrier gas is the same as the second carrier gas.

\* \* \* \* \*